United States Patent [19]
Borrman

[11] 4,254,982
[45] Mar. 10, 1981

[54] YOKE-LIKE ATTACHMENT ASSEMBLY
[75] Inventor: Bo Borrman, Vesteras, Sweden
[73] Assignee: AB Asea-Atom, Sweden
[21] Appl. No.: 22,548
[22] Filed: Mar. 21, 1979
[30] Foreign Application Priority Data
Mar. 22, 1978 [SE] Sweden .................................. 7803283
[51] Int. Cl.³ .............................................. B66C 1/10
[52] U.S. Cl. ................................. 294/81 R; 403/387; 403/400
[58] Field of Search ................. 294/67 R, 67 B, 67 D, 294/67 DA, 67 DB, 81 R, 81 SF, 85, 86 R, 86 A, 90; 212/4; 403/385, 387, 400; 414/146

[56] References Cited
U.S. PATENT DOCUMENTS

| 2,807,493 | 9/1957 | Ryan et al. | 294/67 DA X |
| 3,433,459 | 3/1969 | Logan | 294/81 R X |
| 3,437,369 | 4/1969 | Gealy | 294/90 X |
| 3,972,553 | 8/1976 | Johnston | 294/81 R X |
| 4,108,485 | 8/1978 | Jennings | 294/81 R X |

Primary Examiner—Johnny D. Cherry

[57] ABSTRACT

A yoke-like attachment assembly for connecting a lifting hook with a lid portion of a nuclear reactor pressure vessel or the like, comprising a plurality of separate coupling assemblies extending parallel to each other between the lifting hook and lid, wherein each coupling assembly is capable of supporting the entire weight of the lid in the event of the failure of the remaining coupling assembly. Each coupling assembly includes a pair of spaced sheet-metal lugs, each mounted on a support plate assembly, with at least one bolt interconnecting the spaced lugs with the lifting hook positioned therebetween. Each support plate assembly is attached to a separate beam which, in turn, is attached to the lid.

8 Claims, 4 Drawing Figures

YOKE-LIKE ATTACHMENT ASSEMBLY

BACKGROUND OF THE INVENTION

The present invention generally relates to a yoke-like attachment assembly adaptable for mounting on the lid portion of a nuclear reactor vessel or the like and engagable with the hook portion of a lifting mechanism, to allow for selective removal of the lid from the pressure vessel as may be required. In particular, the present invention is directed to an attachment assembly including a plurality of separate couplings arranged in parallel between the lifting hook and the reactor lid, with each coupling capable of supporting the entire weight of the reactor lid, in the unlikely event of the failure of the remaining coupling.

Because of the potential environmental hazard created by equipment failure in certain installations such as nuclear power stations and the like, it is essential for the safety of the equipment as well as the environment that back-up mechanical systems be capable of performing in the event of failure to the main mechanical systems. Such a back-up mechanical system is often referred to as a fail-safe system, wherein the back-up system is generally arranged in parallel with the main mechanical system and automatically provides the desired operation upon failure of the main system. One such mechanical assembly which usually involves at least one back-up coupling is the attachment assembly mounted on the reactor lid which is attachable with a lifting mechanism for selective removal of the lid from its respective pressure vessel. If a back-up coupling were not employed between the lid and the lifting hook, serious damage to the contents of the nuclear reactor pressure vessel may occur if the main coupling assembly between the lid and the lifting hook were to fail, causing the lid to impact against the contents of the pressure vessel. Furthermore, because of the presence of radiation, such a failure could prove potentially harmful to the surrounding environment.

As will be described in detail hereafter, the present invention solves the problem of providing an attachment assembly for lifting a nuclear reactor lid or the like from its respective pressure vessel, wherein the attachment assembly includes at least two parallel couplings extending between the lifting hook and the lid itself, to ensure removal of the lid in the event of the mechanical failure to one of the couplings.

OBJECTS AND SUMMARY OF THE PRESENT INVENTION

An object of the present invention is to provide a yoke-like attachment assembly for joining a lifting hook with the lid portion of a nuclear reactor pressure vessel or the like, wherein the attachment assembly includes at least two couplings extending in parallel between the lifting hook and the lid to assure adequate support for the lid in the event of the failure to one of the couplings.

A further object of the present invention is to provide an attachment assembly, wherein a first pair of sheet metal support members are fixedly mounted on a first plate assembly and a further pair of sheet metal support members are fixedly mounted on a second plate assembly, with the first plate assembly attached through a hollow beam to the lid, and the second plate assembly attached through a further hollow beam to the lid.

A further object of the present invention is to provide an attachment assembly wherein a pair of bolts extend through and engage the lifting hook with a different pair of sheet metal support members positioned on opposite sides thereof, with each bolt capable of supporting the entire weight of the lid member.

Each of these, as well as additional objects is achieved in a preferred embodiment of the present invention, wherein a pair of hollow beam members are each attached at opposite ends to an upper surface portion of the reactor lid. Three support plates are attached to one of the hollow beams via a plurality of connecting bolts, while two additional support plates are connected to the remaining hollow beam via a further plurality of bolts. A first pair of sheet-metal flanges are spaced from one another and are attached to each of the first three support plates, while a further pair of spaced sheet-metal flanges are attached to each of the two additional support plates. First and second sets of aligned apertures are formed through the first and second pairs of sheet metal flanges, respectively. A lifting hook is positioned between the first and second pairs of sheet metal flanges, with a pair of apertures extending through the lifting hook positioned in alignment with the apertures formed through the flanges. A pair of bolt members extend through the pairs of aligned apertures to engage the lifting hook and sheet metal flange members for joint movement.

Each coupling assembly functions separately to attach the hook member and the nuclear reactor lid. If either of the bolt members were to fail, the remaining bolt member would be capable of supporting the entire weight of the lid as transmitted through the attached flange members. In a like manner, if either pair of sheet metal flanges were to fail, the remaining pair would be capable of supporting the entire weight of the lid. In addition, if any of the first three support plates or any of the second pair of support plates were to fail, the remaining support plates would provide sufficient support for the lid member. Finally, if either of the hollow beam members were to fail, the remaining beam member would be capable of supporting the entire weight of the lid.

The present invention will become apparent from a reading of the following specification and claims together with the accompanying drawings, wherein similar elements are referred to and are indicated by similar reference numerals.

BRIEF DESCRIPTION OF THE DRAWINGS

The present invention can be best understood with reference to the accompanying drawings, wherein.

DETAILED DESCRIPTION OF THE PREFERRED EMBODIMENT

Figure 1:
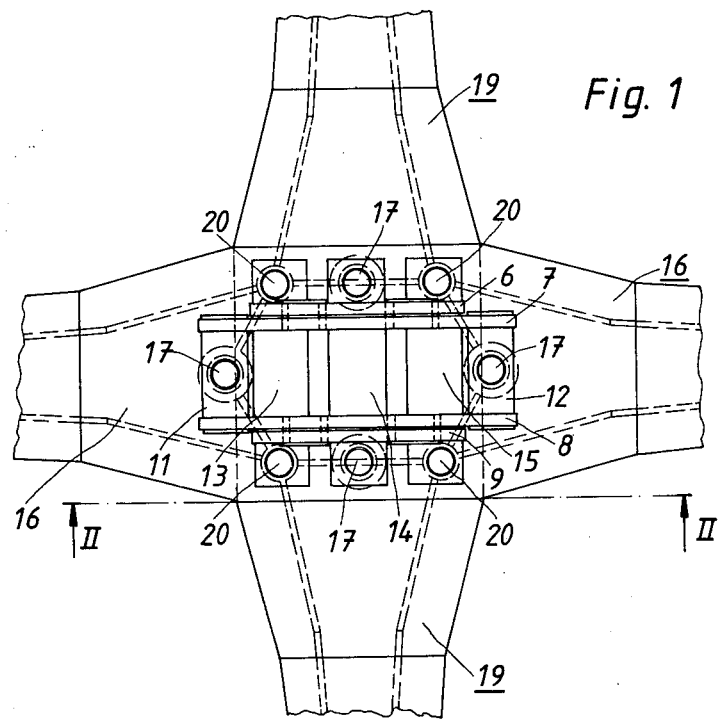
FIG. 1 shows the top view of a lifting-yoke attachment assembly formed in accordance with a preferred embodiment of the present invention.
Figure 2:
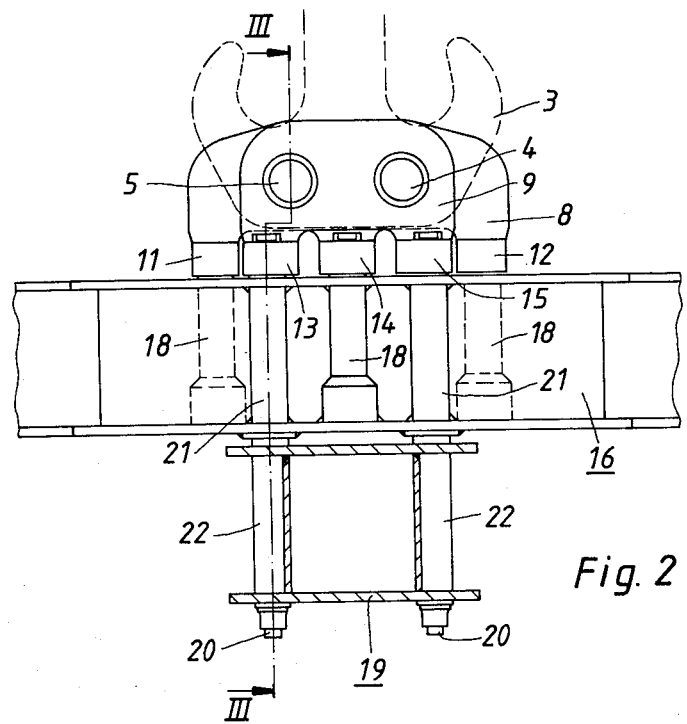
FIG. 2 shows a section through a plane II—II appearing in FIG. 1.
Figure 3:
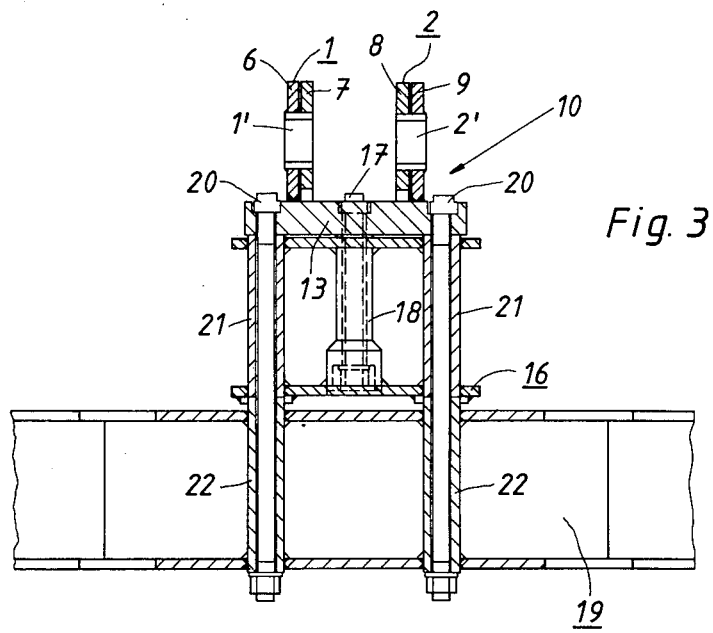
FIG. 3 shows a sectional view through a plane III—III of FIG. 2.

Referring to the drawings, and to FIGS. 1-3 in particular, a preferred embodiment of the attachment assembly is generally indicated at 10. Attachment assembly 10 includes a pair of substantially rectangularly-shaped, lifting lug assemblies generally designated at 1 and 2, respectively. Lifting lug 1 includes a pair of substantially parallel extending, sheet-metal elements 6 and 7 arranged adjacent to one another, wherein each element extends within a separate, substantially vertical plane. In a similar manner, lifting lug assembly 2 includes a pair of substantially parallel extending, sheet metal elements 8 and 9, respectively wherein the elements are positioned adjacent to one another and each element extends within a separate, substantially vertical plane.

Sheet metal elements 7 and 8 are spaced from one another and each element includes an end portion welded to a plurality of substantially horizontally extending support plates 11, 12 and 14, respectively. In a similar manner, sheet metal elements 6 and 9 are spaced from one another and each sheet element includes an end portion welded to a further pair of substantially horizontally extending support plates 13 and 15. Support plates 11 and 12 are each attached, in turn, to a first hollow beam 16 via a plurality of two relatively short bolt members 17 extending therebetween. In addition, support plate 14 is attached to beam 16 via a pair of additional bolt members 17. Each of the bolt members 17 is positioned within a guide bushing 18 welded to hollow beam 16. In a similar manner, support plates 13 and 15 are each secured to a further hollow beam 19 via a pair of relatively long bolt members 20 extending therebetween. Each of the bolts 20 extends through a separate guide bushing 21 which is also welded to hollow beam 16. Additionally, each of the bolts 20 extends through a further guide bushing 22 welded to hollow beam 19 and aligned with guide bushings 21. Finally, each of the hollow beams 16 and 19 include vertical stays formed at either end portion thereof, which are not shown in the drawings for purposes of clarity. Each of the stays is connected to a separate lifting eye mounted on an upper surface of the reactor vessel lid.

Referring to FIGS. 2 and 3 in particular, a lifting hook member 3 is positioned between lug assemblies 1 and 2, wherein hook 3 may be attached to a conventional lifting mechanism, not shown for purposes of clarity. First and second pairs of axially spaced and aligned apertures 1' and 2' are formed through lug assemblies 1 and 2, respectively, with hook member 3 including a pair of through apertures aligned with each of the pairs of apertures 1' and 2'. A first lifting bolt 4 extends through a first set of aligned apertures 1' and 2' as well as the aligned aperture in hook 3, while a second lifting bolt 5 extends through a further pair of the aligned apertures 1' and 2' as well as an aligned aperture in hook member 3.

During normal operation, the load provided by the weight of the nuclear reactor lid is uniformly distributed between the two hollow beam members 16 and 19, respectively. If one of the beams should fail due to stress or the like, the entire load would be transferred to the remaining beam without any noticeable dynamic increase. Each beam member 16 and 19 along with its respective attachment bolts, support plates and pair of lifting lug members, constitutes a separate, parallel coupling extending between lifting hook 3 and the lid member, not shown, wherein each coupling is constructed to support the entire weight of the lid. As for example, if any of the support plates 11, 12 or 13 were to fail, the remaining pair of support plates 13 and 15 would provide sufficient support for the lid member. Inversely, if either of the support plates 13 or 15 were to fail, the remaining support plates 11, 12 and 14 would provide sufficient support for the lid member. As a result, each system of support plates provides a redundant coupling element for supporting the weight of the nuclear reactor lid.

Figure 4:
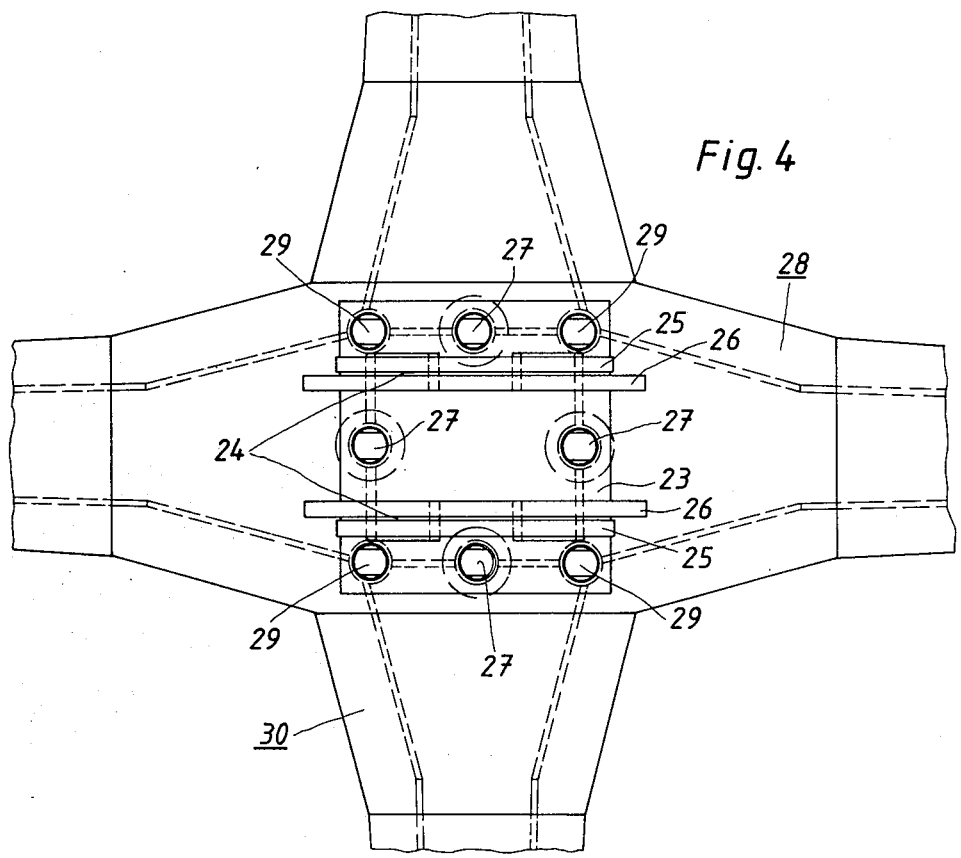
FIG. 4 shows a top view of a further lifting-yoke attachment assembly formed in accordance with an alternative embodiment of the present invention.

Turning to the embodiment shown in FIG. 4, two separate sets of redundant support plates have been eliminated, with a single support plate 23 substituted therefore. A pair of parallel extending, and spaced lifting lug assemblies 24 are each welded to support plate 23. Each lifting lug 24 includes a pair of parallel extending sheet metal elements 25 and 26, respectively, with each element welded into attachment with support plate 23 via a plurality of spaced welding seams. Elements 25 and 26 are positioned in such a manner that the welding seams themselves form no mechanical connection between the elements 25 and 26 and support plate 23. As for example, sheet metal element 26 can be located such that the welding seams are positioned only on a vertical surface of support plate 23, while each sheet metal element 25 is positioned such that the welding seams are located only on horizontal surfaces of support plate 23. Lifting lugs 24 are provided with a plurality of aligned apertures similar to the apertures 1' and 2' formed through lug assemblies 1 and 2, respectively. A lifting hook 3 is positioned between lifting lugs 24, with a plurality of connecting bolts extending through aligned apertures formed in lugs 24 and the hook member in a manner similar to bolts 4 and 5, respectively. A first plurality of screw bolts 27 extend between and are each attached to support plate 23 and to a hollow beam member 28, wherein a further plurality of screw bolts 29 extend between and are each attached to support plate 23 and to a further hollow beam member 30. If hollow beam 30 is assumed to be positioned beneath hollow beam 28, screw bolts 29 would of necessity be formed with a greater relative length than screw bolts 27.

During operation of the embodiment of FIG. 4, if either of the pair of sheet metal elements 24 and 26 fail, the remaining pair of elements would provide the entire support for the weight of the lid member. In addition, if either beam 28 or 30 were to fail, the remaining beam would likewise provide the entire support for the lid member.

The present invention is not to be limited to the above-described embodiments, but is to be limited only by the scope of the following claims.

What is claimed is:

1. A fail-safe lifting assembly for engaging a lifting hook with a lid portion of a nuclear pressure vessel and the like, and comprising:

a pair of separate beam members each having first and second end portions adaptable for engagement with said lid portion;

first and second lug assemblies extending on either side of said lifting hook, with aligned apertures extending through each lug assembly and said lifting hook and a connecting bolt extending therethrough;

coupling means connecting a first portion of said first and second lug assemblies with one of said beam members and further connecting a second portion of said first and second lug assemblies with the remaining beam for providing a pair of separate lifting connections between said hook and said lid portion of said nuclear pressure vessel, with each lifting connection capable of supporting the entire weight of the lid portion of said nuclear pressure vessel in the event of the failure of the remaining lifting connection.

2. A fail-safe lifting assembly according to claim 1, wherein a pair of apertures are formed through each lug assembly and said lifting hook, with each aperture formed through one of said lug assemblies aligned with an aperture in said hook and an aperture formed through a remaining lug assembly and a pair of connecting bolts extending through each set of aligned apertures.

3. A fail-safe lifting assembly according to claim 1, wherein each lug assembly includes a pair of substantially rectangularly-shaped elements extending parallel to one another and formed of a sheet-metal like material.

4. A fail-safe lifting assembly according to claim 3, wherein said coupling means comprises a first plurality of separate plate members, with each plate fixedly attached to one sheet-metal like element extending on each side of said hook, and including a plurality of attachment bolts interconnecting said first plurality of separate plate members with one of said beam members, and said coupling means further comprises a second plurality of separate plate members, with each of said second plurality of separate plate members fixedly attached to a further sheet-metal element extending on either side of said hook, and including a further plurality of attachment bolts interconnecting said second plurality of plate members with a further one of said beam members.

5. A fail-safe lifting assembly according to claim 4, wherein said first plurality of plate members includes three separate, substantially horizontally extending plate members.

6. A fail-safe lifting assembly according to claim 5, wherein said first and second plurality of plate members extend in substantially the same horizontal plane.

7. A fail-safe lifting assembly according to claim 4, wherein said second plurality of plate members includes two further, substantially horizontally extending plate members.

8. A fail-safe lifting assembly according to claim 4, wherein said further one of said beam members extends between said one beam member and said lid member,
  with said attachment bolts extending between said one beam member and said first plurality of plates being longer than the further attachment bolts extending between said further one of said beam member and said second plurality of plate members.

* * * * *